United States Patent

Root et al.

[11] 4,046,237
[45] Sept. 6, 1977

[54] CLUTCH WITH TORQUE LIMITING BRAKE

[75] Inventors: Robert S. Root, Syracuse; Frederick P. Taylor, Bridgeport; William J. MacKendrick, Syracuse, all of N.Y.

[73] Assignee: Lipe-Rollway Corporation, Syracuse, N.Y.

[21] Appl. No.: 612,374

[22] Filed: Sept. 11, 1975

[51] Int. Cl.² .......................... F16D 7/06; F16D 67/02
[52] U.S. Cl. ................................. 192/13 R; 192/106.1; 64/29; 188/218 XL
[58] Field of Search ............... 192/13 R, 106.1, 106.2, 192/7 R; 188/71.2, 218 XL; 64/29

[56] References Cited

U.S. PATENT DOCUMENTS

| 3,063,263 | 11/1962 | Bobst et al. | 64/29 |
| 3,763,977 | 10/1973 | Sink | 192/13 R |
| 3,893,553 | 6/1975 | Hansen | 64/29 X |

*Primary Examiner*—Benjamin W. Wyche
*Attorney, Agent, or Firm*—Bruns & Jenney

[57] ABSTRACT

A torque limiting brake for a heavy duty automotive clutch. The brake, which is keyed to the driven shaft, is engaged by the release mechanism when the clutch is disengaged and moved into engagement with an adjacent stationary surface. This operates to stop the rotation of the driven shaft which tends to continue rotating due to inertia. To prevent damage to the brake when excessive braking pressure is applied, a yieldable connection is provided between the brake inner portion that is keyed to the driven shaft and its outer portion that engages the stationary surface whereby the former can have limited rotation relative to the latter if the braking pressure exceeds a predetermined amount.

5 Claims, 6 Drawing Figures

CLUTCH WITH TORQUE LIMITING BRAKE

BACKGROUND OF THE INVENTION

This invention relates generally to friction clutches, and has particular reference to a novel torque limiting brake for heavy duty automotive clutches.

Brakes for friction clutches have been developed and used heretofore, the purpose of the brake being to stop the rotation of the driven shaft upon disengagement of the clutch. Without a brake, the driven shaft tends to continue rotating after disengagement due to inertia and this causes transmission damaging gear clash in ensuing gear shifting operations. Clutch brakes of the type referred to are disclosed in U.S. Pat. Nos. 2,863,537 and 3,179,217, granted Dec. 9, 1958 and Apr. 20, 1965 respectively to R. S. Root and assigned to the assignee of the present invention.

While clutch brakes minimize damage and noise during gear shifting in motor vehicles, it has been found that the brake itself can become damaged by the application of excessive braking pressure. Thus, excessive torsional loads on the tangs that key the brake to the driven shaft can ultimately cause the tangs to shear. To solve this problem, torque limiting clutch brakes have been developed, such a brake being disclosed in U.S. Pat. No. 3,763,977, granted Oct. 9, 1973 to W. H. Sink. In the Sink brake, which is the closest prior art known to the applicants, pre-loaded Belleville washers are located between an outer friction section and inner brake section and these allow the inner section to slip relative to the outer section when excessive braking pressure is applied.

SUMMARY OF THE INVENTION

The torque limiting clutch brake of the invention includes an inner annular plate that is keyed to the driven shaft and an assembly of flexible annular plates that encircles the inner plate, the encircling assembly being arranged to be moved by the clutch release mechanism into engagement with an adjacent stationary surface. The inner plate is provided with a ring of apertures in which ball elements are positioned and the latter project into a confronting ring of apertures in one of the flexible plates. This provides a yieldable connection between the encircling assembly and inner plate whereby, when the force applied to the encircling assembly by the release mechanism exceeds a predetermined amount, the ball elements spring the flexible annular plates outwardly and advance to successive apertures in the flexible plate having the aperture ring.

DESCRIPTION OF THE PREFERRED EMBODIMENT

Figure 1:
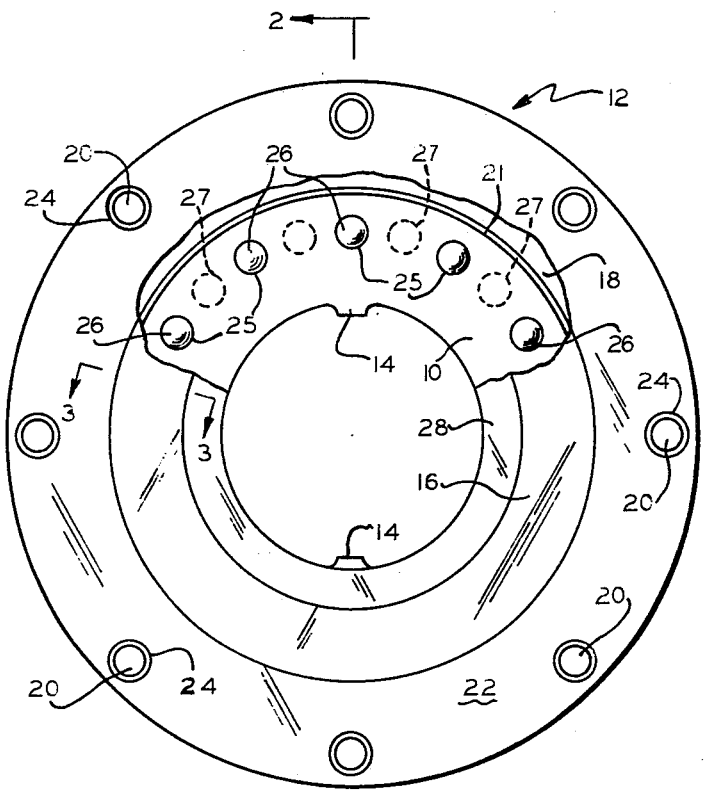
FIG. 1 is a side elevation of a torque limiting clutch brake embodying the invention, with parts broken away to better show the construction.

Referring now to the drawings, the clutch brake that is disclosed herein is for use in an otherwise conventional friction clutch such as that disclosed in Root U.S. Pat. No. 3,179,217, cited above. Accordingly, reference may be had to the Root patent for a description of the function and operation of the conventional clutch components, including the release mechanism 8 that actuates the brake. The brake is keyed to but axially movable on the driven shaft 11, and when the clutch is disengaged the brake is engaged by the release mechanism and moved into engagement with an adjacent stationary surface such as a portion of the transmission housing 9. This operates to stop the rotation of the driven shaft which normally tends to continue rotating after disengagement due to inertia.

Figure 2:
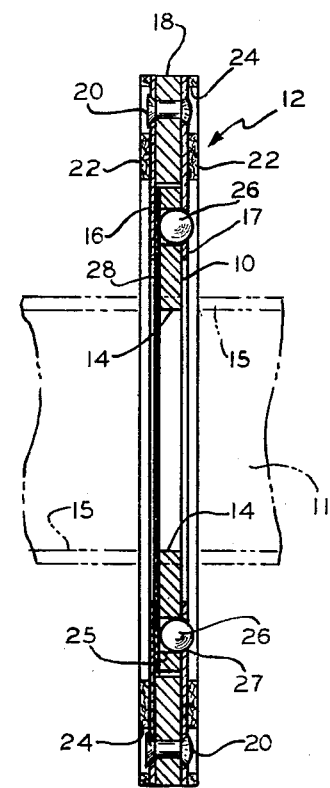
FIG. 2 is a vertical section through the clutch brake taken on line 2—2 of FIG. 1.

The clutch brake of the invention is essentially comprised of an inner annular plate 10 that is keyed to the driven shaft 11, FIG. 2, and an outer plate assembly generally indicated at 12 that encircles the inner plate in a manner to be described. The keying is effected by a pair of tangs 14 on the inner plate that are received with sliding fit in longitudinal grooves 15 in the shaft.

The outer plate assembly 12 includes a pair of annular plates 16 and 17 that partially overlie the inner plate 10 on opposite sides thereof as shown. The plates 16 and 17 are spaced apart by an annular spacer ring 18 that is concentric with the inner plate, the plates 16, 17 and ring 18 being secured together as by rivets 20. A clearance space indicated at 21 in FIG. 1 is provided between inner plate 10 and ring 18 so that one can move freely relative to the other.

A ring 22 of conventional friction facing material is bonded to the outer side of each plate 16 and 17, and during disengagement of the clutch the facing material on plate 16, for example, is engaged by a flat surface on the release mechanism 8. The release mechanism moves the brake until the facing material on plate 17 engages a flat surface on the transmission housing 9 whereby the brake is in effect clamped between the release mechanism and housing. The facing material rings 22 are provided with apertures 24 to accommodate the rivets 20.

The inner annular plate 10 is formed with a ring of apertures 25, which ring is concentric with and spaced between the inner and outer edges of the plate as best shown in FIG. 1. Positioned in each aperture 25 is a ball rolling element 26 and the diameters of these balls exceed the thickness of the plate, FIGS. 2 and 3, so the balls normally project outwardly from one side of the plate as shown.

The outer annular plate 17 is also formed with a ring of apertures 27 and this aperture ring confronts the ring of apertures 25 in the inner annular plate. A portion of each ball 26 normally projects into an aperture 27 but because there are twice as many apertures in the outer ring as in the inner ring, as indicated in FIG. 1, only every other aperture 27 receives a ball in the embodiment shown. The balls 26 provide a yieldable connection between the outer plate assembly 12 and inner plate 10 and in accord with the invention permit limited rotation of the latter relative to the former if the braking pressure exceeds a predetermined amount.

Figure 3:
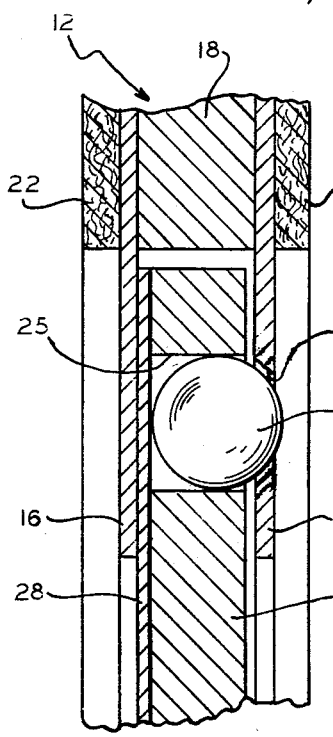
FIG. 3 is an enlarged, fragmentary section through the clutch brake taken on line 3—3 of FIG. 1.
Figure 4:
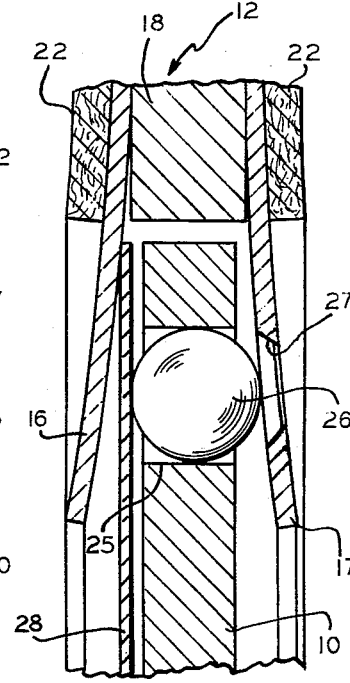
FIG. 4 is a view corresponding to FIG. 3 but showing the position of the parts as the inner annular plate moves relative to the outer flexible annular plates.
Figure 5:
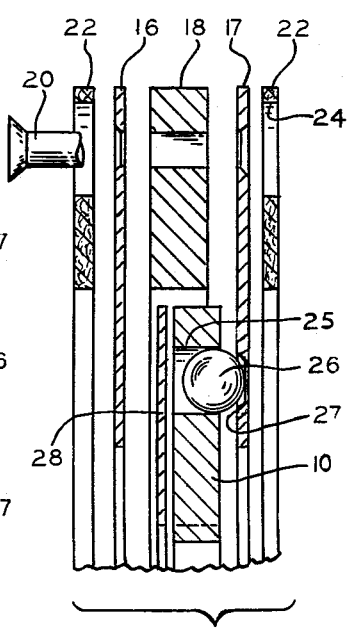
FIG. 5 is an enlarged, exploded sectional view corresponding to the upper part of FIG. 2.
Figure 6:
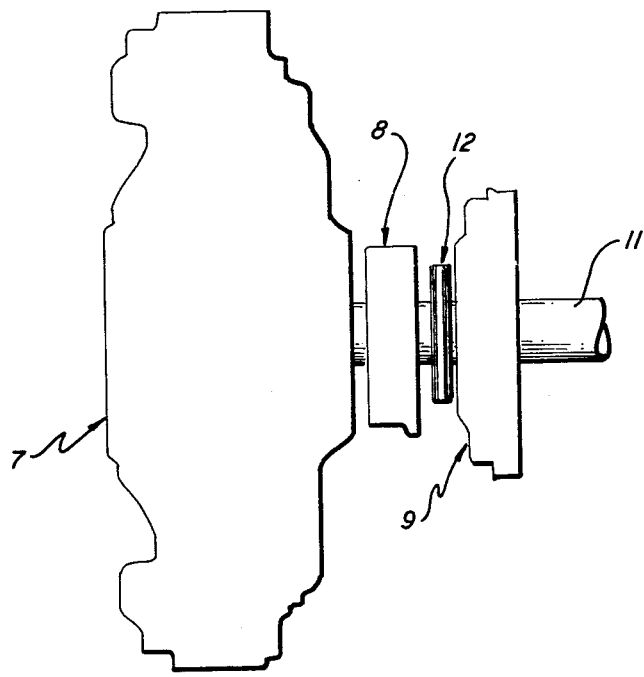
FIG. 6 is a reduced diagrammatic side elevation showing the location of the clutch brake with respect to the release mechanism and stationary surface with which it coacts.

If the vehicle operator applies excessive pressure to the clutch pedal with the result that the clutch brake is slammed against the transmission housing, the inertia of the driven shaft 11 will operate through inner plate 10 to make the balls 26 spring plates 16, 17 outwardly as shown in FIG. 4 whereby the balls respectively advance from one aperture 27 in plate 17 to another. This is possible because the outer annular plates 16, 17 are substantially thinner than inner plate 10 and are relatively flexible. Also, as best shown in FIGS. 3 and 4, the apertures 27 are bevelled on the inside of plate 17 which facilitates the outward camming of the plate by the spherical ball surfaces.

As may be seen from the drawings, outer annular plate 16 does not have any ball receiving apertures and positioned between plate 16 and the inner plate 10 is a relatively thin secondary annular plate 28. Plate 28 is maintained in position by being disposed between plates 16 and 10 but otherwise is not fixed to any part of the brake and is free to rotate independently thereof.

When the balls 26 start to cam plate 17 outwardly, the opposite force exerted by the plate causes the plates 28 and 16 to move outwardly whereby the balls tend to become centered in the inner plate apertures 25 as can be seen by comparing FIGS. 3 and 4. The function of the freely rotatably plate 28 is to enable the balls to roll as they move across the areas of plate 17 between the apertures 27. This of course reduces wear between the balls and plate.

From the foregoing description it will be apparent that the invention provides a novel torque limiting clutch brake that effectively minimizes damage and noise during gear shifting and at the same time makes provision for protecting the brake itself against damage when excessive braking pressure is applied. As will be understood by those familiar with the art, the invention may be embodied in other specific forms without departing from the spirit or essential characteristics thereof.

We claim:

1. In a friction clutch for connecting driving and driven shafts, the clutch including a release mechanism for effecting disengagement of the clutch, a clutch brake cooperable with the release mechanism and a stationary surface adjacent the clutch comprising an inner annular plate having an aperture, the plate being keyed to the driven shaft, means encircling the inner annular plate and arranged to be moved by the release mechanism into engagement with the stationary surface during disengagement of the clutch, the encircling means including a flexible annular plate having a ring of apertures on the same radius as the inner annular plate aperture, and means yieldably connecting the encircling means to the inner annular plate including at least one ball positioned in the inner plate aperture, the diameter of the ball being greater than the thickness of the inner plate whereby the ball projects into one of the apertures in the flexible annular plate of the encircling means, the ball being movable from one flexible plate aperture to another to permit relative movement between the encircling means and inner annular plate when the force applied to the encircling means by the release mechanism exceeds a predetermined amount.

2. In an automotive clutch for connecting driving and driven shafts, the clutch including a release mechanism for effecting disengagement of the clutch, a torque limiting clutch brake cooperable with the release mechanism and a stationary surface adjacent the clutch comprising an inner annular plate keyed to the driven shaft, the plate having a ring of apertures concentric with and positioned between the inner and outer edges of the plate, a plurality of ball elements disposed in the plate apertures, means encircling the inner plate and arranged to be moved by the release mechanism into engagement with the stationary surface during disengagement of the clutch, the encircling means comprising a pair of flexible annular plates positioned on opposite sides of the inner plate, and means connecting said pair of plates together outwardly of the outer edge of the inner plate, one of the flexible annular plates having a ring of apertures confronting the ring of apertures in the inner annular plate, the ball elements projecting into some of the apertures in the flexible annular plate to provide a yieldable connection between the encircling means and inner plate, the ball elements being operable when the force applied to the encircling means by the release mechanism exceeds a predetermined amount to spring the flexible annular plates outwardly and move to successive apertures in said one flexible plate thereby permitting relative movement between the encircling means and inner annular plate.

3. A clutch as defined in claim 2 wherein the encircling means includes a spacer ring positioned between the flexible annular plates outside the outer edge of the inner annular plate.

4. A clutch as defined in claim 2 wherein the diameter of each ball element is greater than the thickness of the inner annular plate whereby the elements project beyond the surface of the plate and into the apertures of said one flexible annular plate.

5. A clutch as defined in claim 2 wherein only one of the flexible annular plates has a ring of ball element receiving apertures, the clutch brake including a freely rotatable secondary annular plate positioned between the other flexible annular plate and the inner annular plate to help the ball elements to roll when the inner annular plate moves relative to the encircling means.

* * * * *